July 7, 1959     J. R. HARCLERODE     2,893,372
MASONRY SAW

Filed Sept. 10, 1956     2 Sheets-Sheet 1

INVENTOR.
John R. Harclerode
BY
ATTORNEY

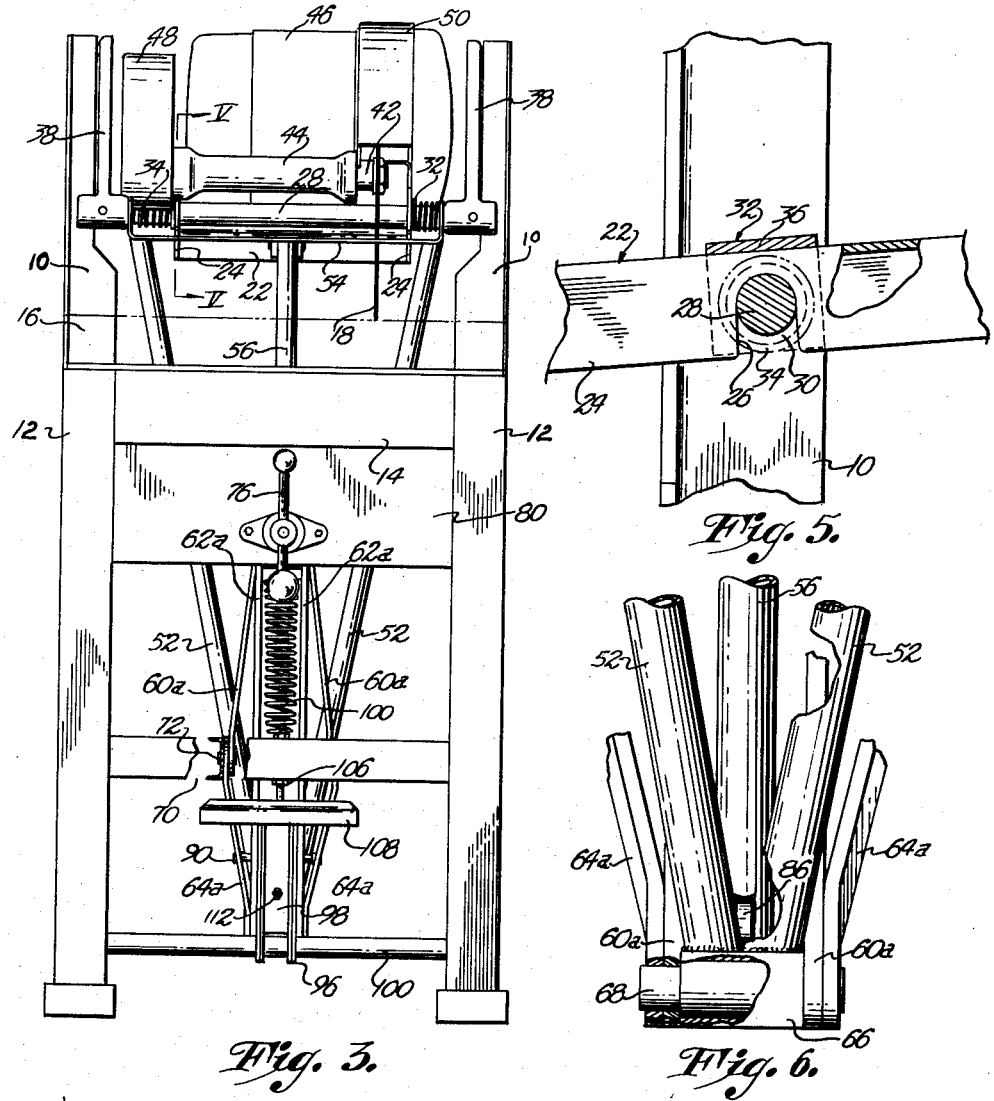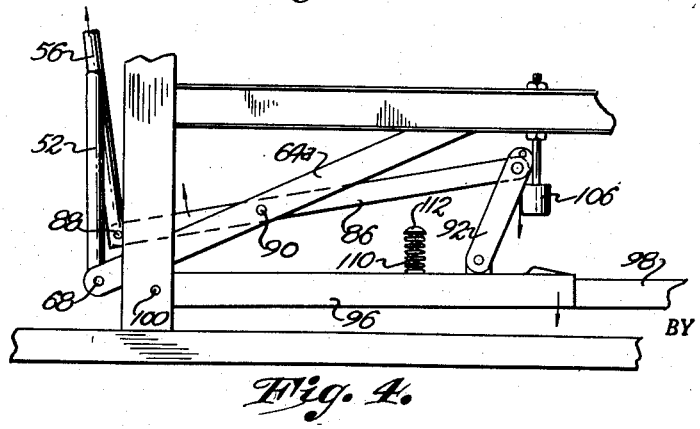

United States Patent Office 2,893,372
Patented July 7, 1959

2,893,372

MASONRY SAW

John R. Harclerode, Kansas City, Mo., assignor to Eveready Briksaw Company, Chicago, Ill., a corporation of Delaware Application September 10, 1956, Serial No. 608,780

2 Claims. (Cl. 125—13)

This invention relates to improvements in material cutting machines, and more particularly, masonry saws and has for its primary object to improve upon the structure disclosed in my copending application Serial No. 584,702, filed May 14, 1956.

It is the most important object of the instant invention to provide a foot-operated masonry saw having resilient means interposed between a foot control lever and a swingable cutter assembly in a novel manner to permit holding of the cutter blade in cutting engagement with a workpiece, yet permit the said cutter blade to yield to hard substances forming a part of the workpiece and through which the cutter must move in its cutting operation.

Another important object of the present invention is to provide a masonry saw having a swingable cutter assembly which may also be raised and lowered with respect to a worktable, the aforementioned yieldable means being entirely associated with the foot control lever remote from the cutter assembly itself and adapted to operate independently of the structure that is operably coupled with the cutter assembly for raising and lowering the latter.

A further object of the instant invention lies in the provision of simplified means for supporting the cutter assembly for swinging movement not only with respect to, but as a unit with a support therefor that is pivotally connected to the frame of the machine.

In the drawings:

Fig. 3 is a front elevational view of the masonry saw shown in Figure 1.

Fig. 4 is a fragmentary view similar to Figure 1 illustrating another position of the foot control lever.

Fig. 5 is an enlarged, fragmentary, detailed, cross-sectional view taken on line V—V of Fig. 3; and Fig. 6 is a fragmentary, rear elevational view of a portion of the machine at the lowermost end thereof.

Figure 1:
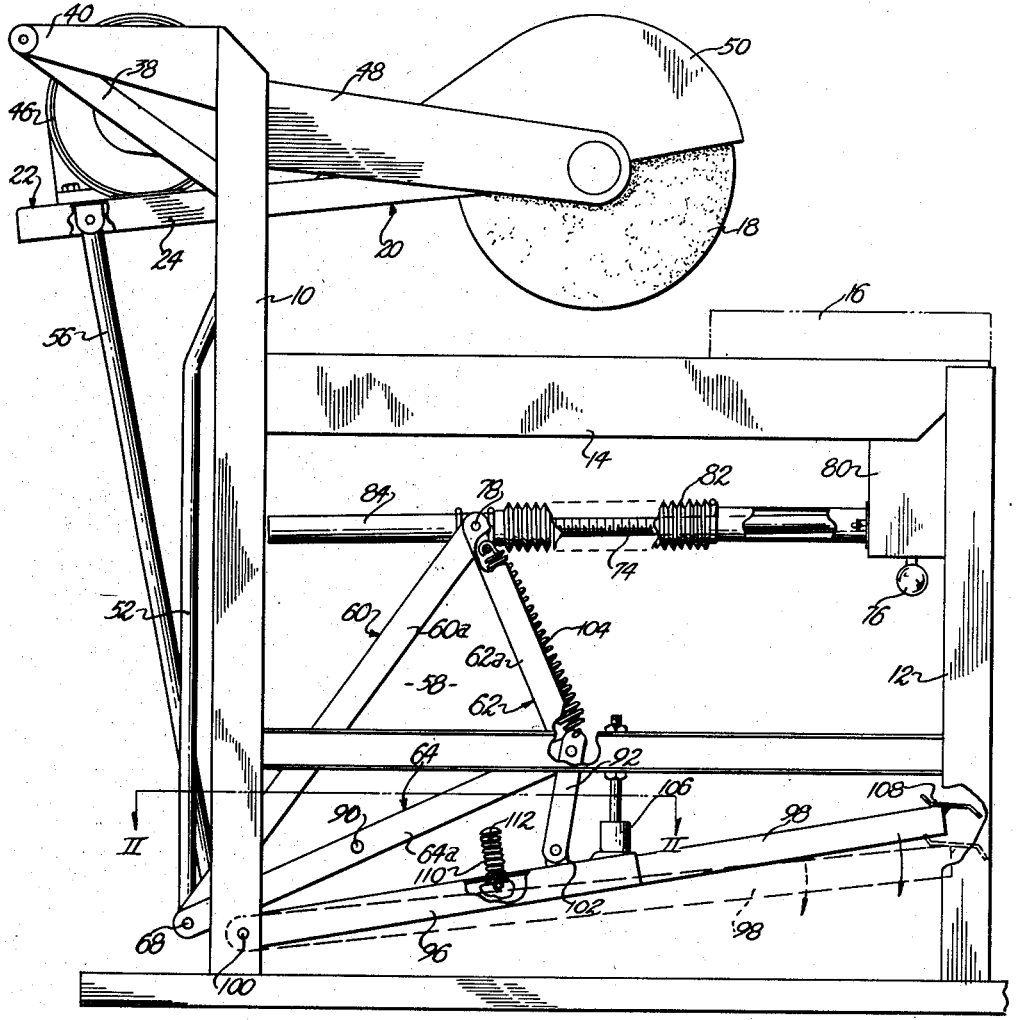
Figure 1 is a side elevational view of a masonry saw made pursuant to the present invention.

Through the medium of a framework that includes a pair of rear posts 10 and a pair of front posts 12, together with a coolant collection pan 14, there is presented in the latter a support for a horizontally reciprocable worktable 16 that supports the work to be severed by a rotating cutter disc 18 forming a part of a cutter assembly 20.

The assembly 20 includes a platform 22 provided with downturned side flanges 24 having downwardly facing notches 26 (see Fig. 5) for receiving a supporting shaft 28. Shaft 28 has a groove 30 for each flange 24 respectively and the platform 22 is releasably attached to the shaft 28 by a pair of opposed L-shaped locking plates 32 on the shaft 28.

One leg of each plate 32 is journaled on the shaft 28 and held against the outer face of the corresponding flange 24 by a spring 34 coiled about the shaft 28. The springs 34 hold the horizontal legs 36 of the locking plates 32 in superimposed relationship to the upper face of platform 22.

Shaft 28 is rigidly secured to the lowermost end of a swingable support that includes a pair of links 38, shaft 28 interconnecting the links 38 and the latter being in turn pivotally secured at the uppermost ends thereof to corresponding extensions 40 projecting rearwardly from the uppermost ends of legs 10—10.

Shaft 42 for the cutter disc 18 is journaled within a bearing 44 secured to the forwardmost end of the platform 22, the platform 22 also supporting a prime mover 46 that is coupled with the shaft 42 by belt and pulley means (not shown) within housing 48 therefor. Additionally, platform 22 carries a hood 50 for the disc 18.

A pair of arms 52 at the rear of the machine diverging as the uppermost ends thereof are approached, have a U-shaped bracket 54 rigidly secured thereto and journaled on the shaft 28 between the links 38, it being noted that springs 34 are disposed between the ends of the bracket 54 and the locking plates 32. A single rod 56 is pivotally connected to the platform 22 adjacent the rearmost end thereof and depends therefrom.

A triangularly-shaped structure 58 carried by the frame of the machine includes three sides 60, 62 and 64, side 60 including a pair of links 60a, the side 62 comprising a pair of links 62a, and the side 64 being provided with a pair of links 64a.

A bearing 66 rigid to the lowermost ends of the arms 52 (see Fig. 6) receives a pivot pin 68 that pivotally connects the sides 60 and 64 to the arms 52. The sides 62 and 64 are pivotally connected to framepieces 70 that are supported by posts 10 and 12 through the medium of pivot pins 72 (see Fig. 3).

A horizontal screw 74 rotatable through use of handle 76 is provided with a follower nut (not shown) interposed between the sides 60 and 62 of structure 58. Opposed studs 78, one of which is shown in Fig. 1, pivotally connects the structure 58 with such follower nut. It is understood that one of the studs 78 receives one of the links 60a and its corresponding link 62a, whereas the other pair of links 60a and 62a are pivotally attached to the said follower nut through the medium of the opposite stud 78. A bracket 80 carried by the legs 12 rotatably receives one end of the screw 74 and holds the same against longitudinal movement. Screw 74 is protected by a flexible covering 82 and by a terminal tube 84 rigid to the follower nut on screw 74.

Figure 2:
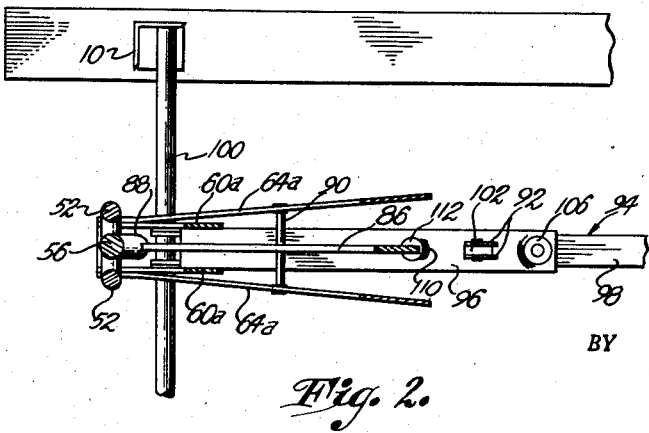
Fig. 2 is a fragmentary, detailed, cross-sectional view taken on line II—II of Fig. 1.

An elongated bar 86 (see Figs. 2 and 4) normally disposed between the links 64a is connected to the rod 56 by a pivot pin 88. Bar 86 is adapted to swing vertically about a pin 90 interconnecting the links 64a and a pair of links 92 depending from the opposite end of the bar 86 pivotally interconnect the latter with a foot control broadly designated by the numeral 94. The control 94 includes a pair of relatively telescoped channel-shaped levers 96 and 98 having a common axis of swinging movement about a horizontal shaft 100 interconnecting legs 10—10. An upstanding lug 102 on the uppermost lever 96 pivotally receives the lowermost ends of the links 92. A spring 104 attached to the links 62a at its uppermost end is connected with one of the links 92 at its lowermost end to yieldingly hold the short lever 96 against bumper or stop 106.

The longer and lowermost lever 98 terminates in a foot pedal 108 and is connected with the lever 96 by a spring 110. Spring 110 is coiled about a bolt 112 passing through the bights of the levers 96 and 98 and is freely reciprocable with respect to the lever 96.

By comparing Figs. 1 and 4 it can be seen that when the foot control 94 is depressed against the action of spring 104, it swings about the shaft 100 exerting a pull on the links 92, thereby swinging the bar 86 about its axis 90 from the full-line position shown in Fig. 1 to the position illustrated in Fig. 4. This action pushes upwardly on the rod 56 to cause the platform 22 to swing vertically about the shaft 28. Such movement lowers the cutter disc 18 toward the worktable 16 and the work may be severed by placing the same on table 16 and simultaneously moving the latter inwardly toward the legs 10.

While the disc 18 is thus held by the foot of the operator resting on pedal 108, the disc 18 may yield upwardly as it comes into cutting engagement with relatively hard substances in the workpiece by virtue of the spring 110. It is seen that the levers 96 and 98 readily separate since spring 110 permits lever 96 to move upwardly toward the stop 106 even while lever 98 is held in a depressed position.

The above action is the same in any of the adjusted positions of the assembly 20 as controlled by the hand lever 76. Rotation of screw 74 imparts swinging movement to the structure 58 about the axes of pintles 72 since movement of the follower nut on screw 74 therealong swings the links 60 and 62 toward and away from the bracket 80. Such movement is imparted to the arms 52 to raise and lower the platform 22.

The pivotal connection between bracket 54 at the upper ends of arms 52 and the shaft 28, swings the links 38 as the platform 22 moves toward and away from the water pan 14. Such height adjustment of the cutting assembly 20 is not impeded by the structure for swinging the platform 22 since the bar 86 is pivotally connected to the links 64 and the entire connection between bar 86 and the platform 22, as well as the control 94, is such as to permit freedom of swinging movement of the structure 58.

Having thus described the invention what is claimed as new and desired to be secured by Letters Patent is:

1. In a machine of the kind described, a frame; shaft means carried by the frame for up and down movement with respect thereto; a cutter assembly carried by said shaft means for vertical swinging movement; structure for raising and lowering the cutter assembly including elongated linkage pivotally mounted at one end thereof on the frame for vertical swinging movement; means operably connecting said shaft means and said linkage at the opposite end of the latter; and mechanism for swinging the cutter assembly comprising a pair of superimposed levers, means mounting the levers on said frames for vertical swinging movement toward and away from each other, an elongated bar, pivot means carried by said linkage intermediate the ends of the latter for swinging movement therewith and supporting the bar for vertical swinging movement relative to said structure, means pivotally connecting the bar with said cutter assembly, means pivotally connecting the bar with the uppermost of said levers, and yieldable means interconnecting the levers for limiting the extent of separation of the levers as the lowermost of said levers is depressed to swing the cutter assembly.

2. In a machine of the kind described, a frame; a shaft having arm means depending therefrom; link means mounting the shaft means on the frame for vertical swinging movement; a cutter assembly carried by the shaft means for vertical swinging movement; structure pivotally connected with said arm means for raising and lowering the cutter assembly; means mounting said structure on the frame for vertical swinging movement; and mechanism for swinging the cutter assembly comprising a pair of superimposed levers, means mounting the levers on said frame for vertical swinging movement toward and away from each other, an elongated bar, pivot means carried by said structure for swinging movement therewith and supporting the bar for vertical swinging movement relative to said structure, means pivotally connecting the bar with said cutter assembly, means pivotally connecting the bar with the uppermost of said levers, and yieldable means interconnecting the levers for limiting the extent of separation of the levers as the lowermost of said levers is depressed to swing the cutter assembly.

References Cited in the file of this patent

UNITED STATES PATENTS

| | | |
|---|---|---|
| 2,171,024 | Coates | Aug. 29, 1939 |
| 2,330,510 | Moffat et al. | Sept. 28, 1943 |
| 2,591,206 | Scott | Apr. 1, 1952 |